W. J. KELLY.
TIRE SHOE.
APPLICATION FILED MAR. 14, 1919.
1,307,445.
Patented June 24, 1919.
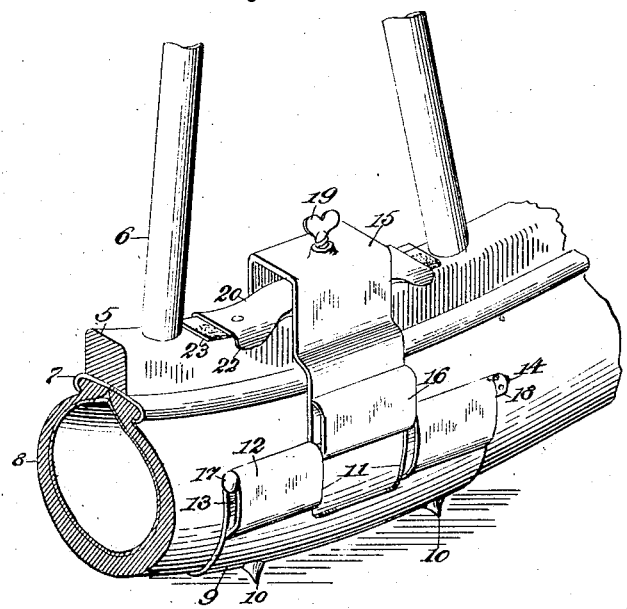
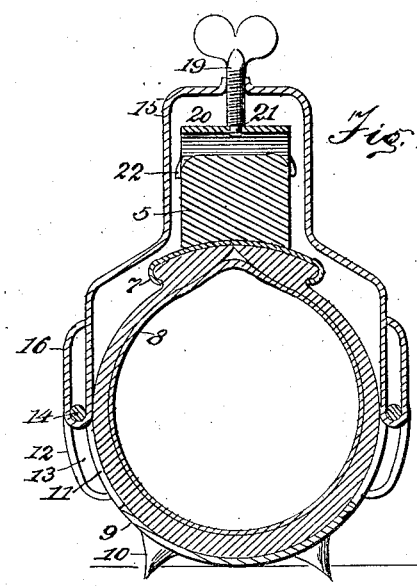
Inventor
William J. Kelly.
By J. M. & John
Atty

UNITED STATES PATENT OFFICE.

WILLIAM J. KELLY, OF CEDAR RAPIDS, IOWA, ASSIGNOR OF ONE-HALF TO E. L. BARBER, OF WYOMING, IOWA.

TIRE-SHOE.

1,307,445.  Specification of Letters Patent.  Patented June 24, 1919.

Application filed March 14, 1919. Serial No. 282,738.

*To all whom it may concern:*

Be it known that I, WILLIAM J. KELLY, a citizen of the United States, residing at Cedar Rapids, in the county of Linn and State of Iowa, have invented certain new and useful Improvements in Tire-Shoes; and I do hereby declare the following to be a full, clear, and exact description of the invention, such as will enable others skilled in the art to which it appertains to make and use the same.

This invention relates to means for aiding the traction of rubber-tired wheels, the object of the invention being to provide such wheels with removable shoes suitably devised to hold their proper position on the wheel and to make a gripping contact with the road.

The nature of the invention is fully disclosed in the description and claims following, reference being had to the accompanying drawing, in which:—

Figure 1 is a view in perspective of a tire shoe embodying my improvements, as attached to a segment of the tire and felly. Fig. 2 is a cross section of the same, centrally of the shoe.

In the drawing, the numeral 5 denotes the felly, 6 the spokes and 7 the rim of an automobile wheel, the rim being of the clencher type. To this is attached a pneumatic tire 8, all of these parts being of familiar construction. To give the tire proper traction, and prevent slippage, the wheel is provided with a number of shoes, of which but one is herein shown, and such will now be described.

The shoe comprises a tread-plate 9 and means for attaching it to the outer portion of the tire. The tread-plate, as herein illustrated, is formed of sheet steel, and confoms to the curvatures of the tire, which fits neatly therein. Projecting from it outwardly are a number of spurs or calks 10 to give the shoe a hold on the road against slippage. These should be securely fastened to the plate, preferably by welding. In the middle of each side of the plate is a gap 11, and on each side thereof is an ear 12 bent to form a long slot 13 to receive a pin 14, which connects the tread-plate on each side with a stirrup 15, having at each end a similarly formed loop 16 narrow enough to slip between the ears of the tread-plate. The pin has a suitable head 17, and is conveniently secured in position by a nut 18, both head and nut being of no greater diameter than the extreme thickness of the ears, so as not to abrade the side of the adjacent tire. The inner portion of the stirrup is best narrowed where it straddles the felly, and is provided with a set-screw 19 for tightly clamping the shoe in place on the tire. The clamping-plate 20 is preferably a spring, whose ends rest mediately or directly on the felly, with the middle part convexed toward the set-screw, a neck 21 passing through a hole in the spring, and headed over to connect the spring and set-screw together. Overturned lips 22 prevent the spring from twisting sidewise on the felly, and a protective cushion-strip 23, of leather or felt, prevents marring or scratching of the felly by any movement of the spring thereon.

It will be evident that the shoe may be easily attached or detached by the shifting of a single pin, and the tightening or loosening of the set-screw.

It will also be evident that the spring serves to hold the tread-plate snugly in position at all times, but allows the stirrup to play back and forth radially according to the corresponding movement of the tread-plate, which is thus held in place frictionally and elastically, but without the rigid clamping of any part.

The elongated slots of the ears through which the connecting pins pass permit extreme movement of the tread-plate inwardly and outwardly, and without necessarily disturbing the position of the stirrup. They also permit the natural rocking movement of the tread-plate on the tire as it passes over the road, and particularly as it passes over stones or other obstructions therein.

Having thus described my invention, I claim:

1. In a tire-shoe, a tread-plate conforming to the outer curvature of a segment of tire, and provided with slotted ears, a stirrup to straddle the felly, and having terminal slotted ears, pins to conneot the ears of the tread-plate and stirrup, and fastening means connecting with the stirrup to engage the felly.

2. In a tire-shoe, a tread-plate having middle gaps at each side and adjacent ears with elongated pin-slots therein, a stirrup to straddle the felly, with legs fitting in said gaps, and pin-receiving ears, pins connecting the stirrup and tread-plate, and means for drawing the stirrup inwardly to clamp the tread-plate in position.

3. In a tire-shoe, a tread-plate conforming to the outer curvature of a segment of tire, a stirrup connecting hingedly therewith, an elastic clamping-plate embraced by the stirrup, and a set-screw in the stirrup bearing on said clamping-plate, whereby the tread-plate is held elastically to proper position.

In testimony whereof I affix my signature in presence of two witnesses.

WILLIAM J. KELLY.

Witneses:
 F. W. ARMSTRONG,
 J. M. ST. JOHN.